March 2, 1937.  M. ANDERSON  2,072,090
DOUBLE UNIVERSAL JOINT ASSEMBLY
Filed Oct. 10, 1935
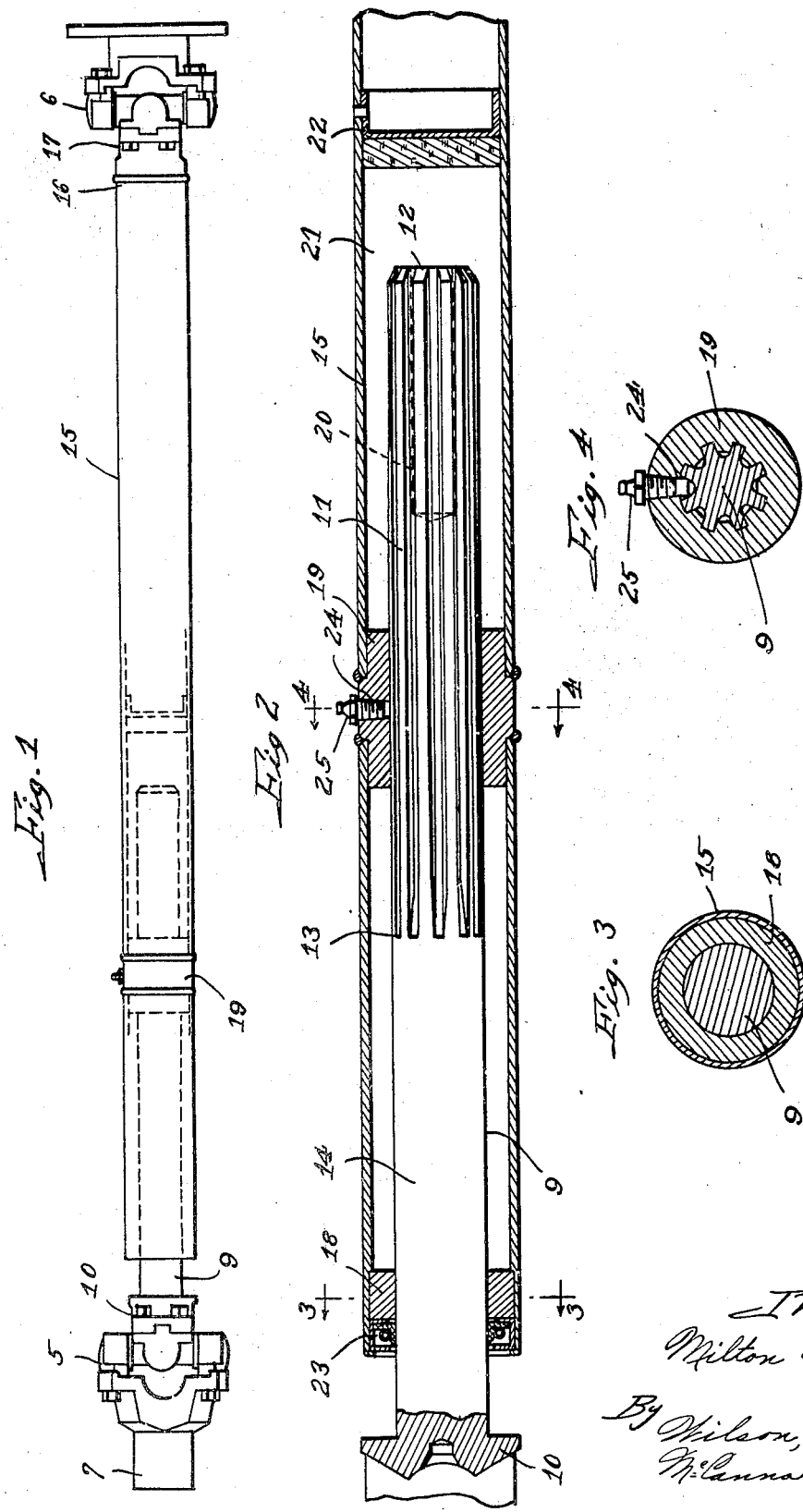

Patented Mar. 2, 1937

2,072,090

UNITED STATES PATENT OFFICE 2,072,090

DOUBLE UNIVERSAL JOINT ASSEMBLY

Milton Anderson, Rockford, Ill., assignor to Borg-Warner Corporation, Chicago, Ill., a corporation of Illinois Application October 10, 1935, Serial No. 44,326

8 Claims. (Cl. 64—1)

This invention relates to double universal joint assemblies of the type having a shaft and a tube in telescoping relation connecting the two universal joints and usually having a splined connection between the shaft and the tube for transmitting drive and allowing axial slip between the shaft and the tube occasioned by relative bodily displacement between the driving and driven universal joints.

My invention has further reference to universal joint assemblies of the type described wherein the universal joints are widely separated and there is considerable axial slip incidental to the conditions of operation. In universal joint assemblies as heretofore constructed, the reduction of bearing between the tube and the shaft incidental to the slip action tended to cause the shaft and tube to run out of alignment, particularly at high speeds, producing an unbalanced condition resulting in vibration, undue wear, and noise.

The primary object of my invention is to provide an improved universal joint assembly with the view to maintaining a balanced condition and attendant advantages when operating under conditions such as herein described. Another object is to provide an assembly of this kind adapted for economical manufacture. Another object is to provide improved lubrication and protection of the spline bearing parts under all conditions of operation.

Other objects and attendant advantages will be appreciated by those skilled in this art as the invention becomes better understood by reference to the following description when considered in connection with the accompanying drawing, in which—

Figure 1 is a side elevation of a double universal joint assembly embodying my invention;

Fig. 2 is an enlarged longitudinal section through the shaft end of the assembly, and Figs. 3 and 4 are cross-sections taken on the lines 3—3 and 4—4, respectively, of Fig. 2.

The drawing shows my invention substantially in the sizes and proportions adapted for application to the electric generator drive on a Pullman car, the generator being underhung in a fixed position on the frame and being driven from one of the truck axles through the intermediary of the double universal joint assembly. In addition to vertical angular variations incidental to travel, there is considerable variation in horizontal distance between the widely separated universal joints incidental to turning movement of the wheel truck around curves and the like. My invention is not confined to this application, but is adapted for motor vehicles as a propeller shaft drive therefor.

Referring more particularly to the drawing, the universal joints designated generally by numerals 5 and 6 may be of any suitable construction; and it is immaterial as to how the universal joints are connected to the ultimate driving and driven parts. In this particular case the universal joint 5 has a shaft coupling 7 for connection to its driving or driven member, and the universal joint 6 has a flange 8 for such connection. Either end of the universal joint assembly may be the driving end.

According to my invention, the shaft designated generally by 9, connected at one end to the coupling member 10 of the universal joint 5, is constructed to provide a splined portion 11 extending from the end 12 inwardly to a medial point here indicated at 13, and the remaining portion 14 is finished to provide an annular bearing surface. The tube, designated by 15, is suitably fixed at its end 16 to the coupling member 17 of the universal joint 6, in this instance by welding. This tube telescopingly receives the splined and annular bearing portions of the shaft 9 and is equipped with an annular bearing 18 suitably mounted in its end portion opposite from its joint 6. This bearing 18 has a sliding fit on the bearing 14 and is designed to maintain the tube in concentric relation to the shaft while allowing axial slip between the tube and the shaft during which the bearing 18 slides on the bearing 14. The tube is further supported on the shaft at a substantial distance from the bearing 18 by means of a bearing 19 having a spline fit on the splined portion 11. In this embodiment the bearing 19 is in the form of a collar serving as a coupling connecting separated portions of the tube 15, the ends of the tube being welded to the collar as shown. The bearing 19 is so located and the splined portion 11 is of such length as to allow for axial slip action of considerable length without the bearing leaving the splined shaft or the splined portion of the shaft being withdrawn from the enclosure formed by the tube. The bearing 19, as in the case of the bearing 18, serves to support the splined end portion of the shaft concentric with the tube. It will be seen that the bearings 18 and 19 will maintain a constant wide-spread bearing between the shaft and the tube during all conditions of operation, and, by reason of this constant bearing length as distinguished from a variable bearing length under prior constructions, the shaft and tube are maintained in alignment at all times, and even under extreme separation of the universal joints the shaft and tube are held in alignment and in a balanced condition. When the assembly is operating in the compressed condition substantially as shown in the drawing, the free end of the shaft overhangs the bearing 19. This overhanging weight is reduced by boring the shaft as at 20, thus further reducing any tendency toward unbalance on account of unsupported weight. It will be further noted that the tube provides an enclosing casing for the splined end of the shaft, so that this portion of the shaft which is subject to wear because of the drive transmitted through the splines and also because of the sliding action of the spline parts, is protected from exposure to dust, grit and other foreign matter. The tube also provides a lubricant chamber 21 which is closed at one end by a transverse partition 22 provided with a suitable seal and at the opposite end by a seal 23 mounted in the tube at the outer end of the bearing 18, the seal 23 having suitable means for compressing an annular wiping element which slides on the bearing 14. Lubricant may be supplied to the tubular casing by simple means, such as through a filler opening 24 which communicates with one of the spline grooves in the shaft, this opening being normally closed by a plug 25.

It is believed that the foregoing conveys a clear understanding of the objects prefaced above, and while I have shown but a single embodiment of the invention, it will be manifest that other applications may be made with appropriate changes in details without departing from the spirit and scope of the invention as expressed in the appended claims, in which—

I claim:

1. A universal joint assembly comprising a pair of universal joints connected by a shaft and a tube in telescoping relation, the shaft being splined from its free end back to a medial point and the remaining portion of the shaft being finished to provide an annular bearing surface, and widely separated bearings fixed in the tube, one bearing having a sliding fit on the annular bearing portion and the other having a sliding spline fit on the splined portion, said bearings supporting the shaft and tube in alignment and maintaining constant, wide-spread bearing during all conditions of extension and compression of the assembly.

2. In a double universal joint assembly, wherein the universal joints are spaced apart and connected by a tube and a splined shaft in telescoping relation, means for maintaining a constant wide-spread bearing of the tube on the shaft comprising an annular bearing member fixed to the tube at its extended end and having sliding bearing on the shaft, and a splined bearing fixed to the tube at a widely spaced point from said annular bearing and having sliding bearing on the splined portion of the shaft.

3. In a universal joint assembly, a pair of universal joints connected by a tube and a shaft in telescoping relation, the shaft having an annular bearing portion at its end connected to its universal joint and being splined at its opposite end, and an annular and a splined bearing fixed to the tube in substantially widely spaced relation and respectively slidably fitting said annular and splined portions of the shaft to maintain constant wide-spread bearing of the tube on the shaft.

4. In a universal joint assembly comprising a pair of universal joints, a shaft connected at one end to one of said universal joints and splined from its opposite end back to a medial point in its length, the remaining portion of the shaft being finished to provide an annular bearing, a tube connected at one end to the other universal joint and telescopingly receiving the splined and bearing portions of said shaft, an annular bearing slidably fitting said bearing portion of the shaft and fixed to the tube at the end thereof opposite from its universal joint connection, and a splined bearing slidably fitting said splined portion of the shaft and fixed in the tube inwardly from said annular bearing, whereby to provide a constant spread bearing of the tube on the shaft serving to maintain alignment thereof and to reduce unbalancing tendencies during operation at high speed when the universal joints are separated to normal maximum operating positions.

5. A universal joint assembly as set forth in claim 4, in which the tube serves to enclose the entire splined portion of the shaft and constitutes a closed lubricant chamber for the splined bearing.

6. A universal joint assembly as set forth in claim 4, in which the universal joints normally operate in widely spaced relation and have substantial movement toward and from each other, the tube serving to enclose the entire splined portion of the shaft and constituting a closed lubricant chamber for the splined bearing on the shaft, and a transverse partition in the tube adjacent to the splined shaft separating the lubricant containing portion of the tube from the remaining portion thereof.

7. The combination of a pair of spaced universal joints, a propeller shaft connected at one end to one of said universal joints and having an annular bearing portion adjacent to its joint-connected end and a splined portion at its opposite end, a propeller tube connected at one end to the other universal joint and telescopingly receiving at its opposite end the splined and bearing portions of said shaft, spaced bearings in the tube providing constant, wide-spread bearing support for the tube concentrically on said annular and splined bearing portions of the shaft, a portion of the splined end of the shaft extending into the tube beyond the splined bearing therein and being internally bored to reduce overhanging weight.

8. The combination of a pair of spaced universal joints, a shaft connected at one end to one of said universal joints and having an annular bearing portion adjacent to its joint-connected end and a splined portion at its opposite end, a tube connected at one end to the other universal joint and telescopingly receiving at its opposite end the splined and bearing portions of said shaft, an annular bearing slidably fitting said bearing portion of the shaft and fixed to the tube at the end thereof opposite from its universal joint connection, an oil seal between the tube and said annular bearing portion of the shaft at the outer end of said annular bearing, a splined bearing slidably fitting said splined portion of the shaft and fixed to the tube a substantial distance from said annular bearing providing constant spread bearing support for the tube on the shaft, the tube serving to enclose the entire splined portion of the shaft under all working conditions and constituting a closed lubricant chamber for said splined bearing portion.

MILTON ANDERSON.